(12) United States Patent
Chen et al.

(10) Patent No.: US 8,999,022 B2
(45) Date of Patent: Apr. 7, 2015

(54) METHOD AND SYSTEM FOR PRODUCING SYNTHETIC GAS FROM BIOMASS

(71) Applicant: Sunshine Kaidi New Energy Group Co., Ltd., Wuhan (CN)

(72) Inventors: Yilong Chen, Wuhan (CN); Hongming Tang, Wuhan (CN); Yanfeng Zhang, Wuhan (CN)

(73) Assignee: Sunshine Kaidi New Energy Group Co., Ltd., Wuhan (CN)

( * ) Notice: Subject to any disclaimer, the term of this patent is extended or adjusted under 35 U.S.C. 154(b) by 0 days.

(21) Appl. No.: 13/745,859

(22) Filed: Jan. 20, 2013

(65) Prior Publication Data

US 2013/0125464 A1    May 23, 2013

Related U.S. Application Data

(63) Continuation-in-part of application No. PCT/CN2011/076921, filed on Jul. 6, 2011.

(30) Foreign Application Priority Data

Jul. 20, 2010   (CN) .......................... 2010 1 0234090

(51) Int. Cl.
*C10J 3/46* (2006.01)
*C10J 3/66* (2006.01)
*C10J 3/72* (2006.01)

(52) U.S. Cl.
CPC .... *C10J 3/46* (2013.01); *C10J 3/66* (2013.01); *C10J 2300/0906* (2013.01); *C10J 2300/0916* (2013.01); *C10J 2300/1238* (2013.01); *C10J 3/721* (2013.01); *C10J 2300/1884* (2013.01); *C10J 2300/1892* (2013.01); *C10J 2300/094* (2013.01); *C10J 2300/0976* (2013.01)

(58) Field of Classification Search
USPC ............... 48/61, 127.9, 127.1, 197 R, 76–78, 48/198.3, 203, 207
See application file for complete search history.

(56) References Cited

U.S. PATENT DOCUMENTS

| | | | | |
|---|---|---|---|---|
| 2,580,767 A | * | 1/1952 | Hall ............................. | 48/214 R |
| 2,878,262 A | * | 3/1959 | Hutchings ...................... | 585/635 |
| 4,264,435 A | * | 4/1981 | Read et al. ..................... | 208/129 |
| 4,400,182 A | * | 8/1983 | Davies et al. ............... | 48/214 A |
| 4,930,429 A | * | 6/1990 | Ryham ......................... | 110/229 |
| 5,780,518 A | * | 7/1998 | Mulyarchik et al. ............ | 521/45 |
| 5,988,080 A | * | 11/1999 | Miyoshi et al. ............... | 110/343 |
| 6,767,375 B1 | * | 7/2004 | Pearson ......................... | 48/111 |
| 2009/0071382 A1 | * | 3/2009 | Clarke et al. .................. | 110/346 |

(Continued)

*Primary Examiner* — Kaity Handal
(74) *Attorney, Agent, or Firm* — Matthias Scholl P.C.; Matthias Scholl

(57) ABSTRACT

A method for producing synthetic gas from biomass by: a) grinding the biomass, feeding the biomass into a pyrolysis furnace while spraying a first superheated water vapor into the pyrolysis furnace, controlling the temperature of the pyrolysis furnace at 500-800° C., contacting the biomass with the first superheated water vapor for a pyrolysis reaction to yield crude synthetic gas and ash including coke; b) cooling the ash, and separating the coke from the ash; c) transporting the crude synthetic gas and the coke into a gasifier, spraying a second superheated water vapor into the gasifier, controlling the gasifier at an operating temperature of 1200-1600° C., contacting the biomass with the second superheated water vapor for a gasification reaction to yield primary synthetic gas; and d) cooling, removing dust, deacidifying, and desiccating the primary synthetic gas to obtain clean synthetic gas.

10 Claims, 1 Drawing Sheet

(56) References Cited

U.S. PATENT DOCUMENTS

| | | | |
|---|---|---|---|
| 2009/0133328 A1* | 5/2009 | Van Den Berg et al. | 48/87 |
| 2009/0250378 A1* | 10/2009 | Wu et al. | 208/132 |
| 2010/0095592 A1* | 4/2010 | Huber | 48/62 R |
| 2010/0270505 A1* | 10/2010 | Gallaspy et al. | 252/373 |
| 2010/0319255 A1* | 12/2010 | Struble et al. | 48/62 R |
| 2012/0003704 A1* | 1/2012 | Medoff | 435/99 |
| 2012/0096768 A1* | 4/2012 | Johnson et al. | 48/61 |
| 2012/0126176 A1* | 5/2012 | Blevins et al. | 252/373 |
| 2012/0196238 A1* | 8/2012 | Goetsch et al. | 432/9 |
| 2013/0125463 A1* | 5/2013 | Chen et al. | 48/119 |
| 2013/0125464 A1* | 5/2013 | Chen et al. | 48/119 |
| 2013/0125465 A1* | 5/2013 | Tang et al. | 48/119 |

* cited by examiner

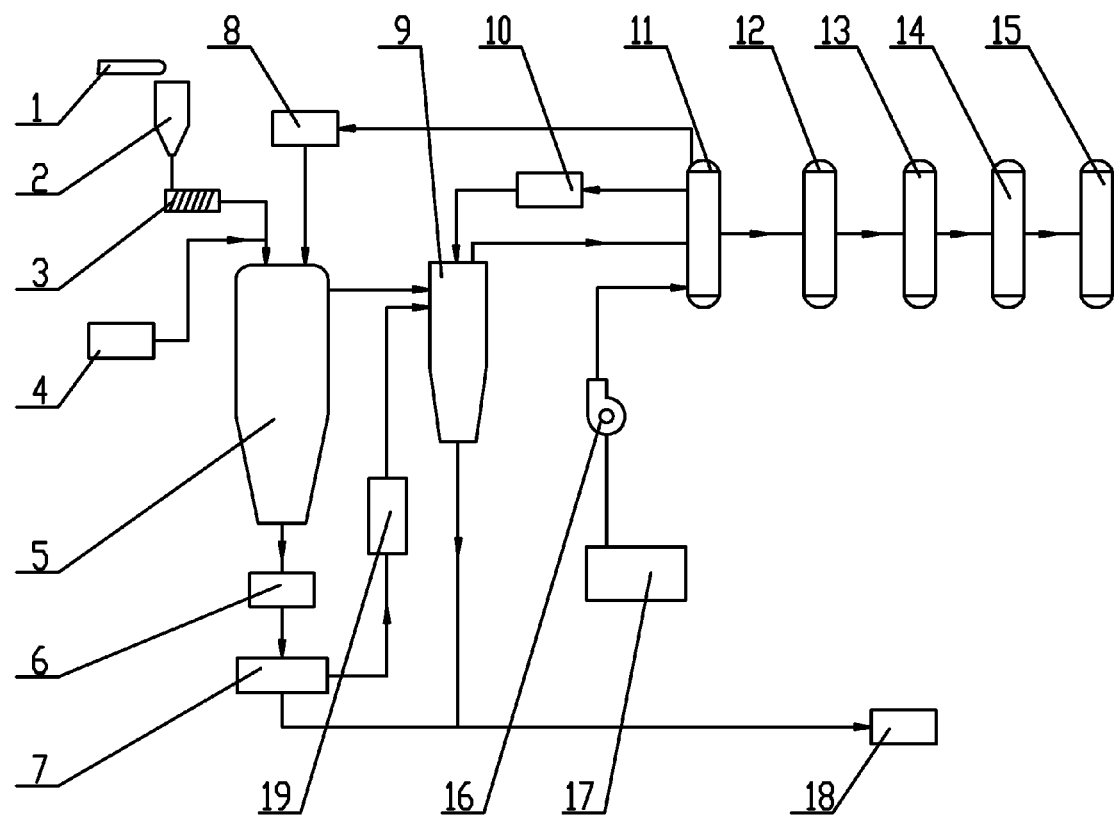

US 8,999,022 B2

METHOD AND SYSTEM FOR PRODUCING SYNTHETIC GAS FROM BIOMASS

CROSS-REFERENCE TO RELATED APPLICATIONS

This application is a continuation-in-part of International Patent Application No. PCT/CN2011/076921 with an international filing date of Jul. 6, 2011, designating the United States, now pending, and further claims priority benefits to Chinese Patent Application No. 201010234090.2 filed Jul. 20, 2010. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention relates to a technology for transforming combustible materials into clean and highly efficient synthetic gas, and more particularly to a method and a system for producing synthetic gas from biomass by low temperature pyrolysis and high temperature gasification.

2. Description of the Related Art

A typical biomass gasification technology includes: fixed bed gasification, fluidized bed gasification, and two stages gasification, all of which are direct gasification technologies. The processes of direct gasification technologies are characterized in that the heat produced by part of the biomass supplies energy resource for gasification, the air, oxygenized air, or a combination of the oxygenized air and water vapor is functioned as an oxidant during the gasification reaction. However, studies have shown that technologies of direct gasification of the biomass are disadvantageous in the following aspects:

First, the components and the heat value of the biomass fuels are unstable, the biomass has low fire point and fast combustible reaction, thus, explosion easily occurs. When part of regions are superheated and coked, the operating temperature of the gasifier is very difficult to control.

Second, when the air works as an oxidant in which the content of the inactive gas of $N_2$ is prominent, it results in a higher content of $N_2$, a lower content of effective gas ($CO+H_2$), and a lower ratio of $H_2/CO$, besides, the heat value of the synthetic gas is low and unstable, which only maintains at 5000 KJ/Nm$^3$ below and hardly meets the need of the later industrial utilization.

Third, when the oxygenized air works as an oxidant, although the content of $N_2$ is relatively lowered, an additional air separating device is necessitated. Because of a large capacity and high energy consumption of the air separating device, such a process largely increases the production cost.

Fourth, when the oxygenized air and the water vapor work as both oxidants, although the content of $N_2$ in the synthetic gas is lowered, and the content of $H_2$ is increased, the water vapor working as a reacting medium still consumes a large amount of heat energy, plus the energy consumption in the air separation, the process largely maximizes the production cost.

Fifth, about 15-20% of the biomass is necessitated to self-ignite for providing the energy resource for gasification, but at the same time a large amount of $CO_2$ is produced in the combustion, correspondingly, the content of effective gas ($CO+H_2$) is decreased. Furthermore, the high temperature synthetic gas and the mixed air carry a large amount of sensible heat, and thus, the conversion of the heat energy into the chemical energy is largely minimized, and the efficiency of the cooled gas is also lowered, which is generally 70% below and no higher than 80% in exceptional conditions.

Sixth, the operating temperature of the gasifier is generally controlled at 800-1200° C., at such a temperature, the gasification of the biomass produces a large amount of tar which is difficult to remove, and too much of tar aggregated in the device and pipes is apt to cause pipe blocking and device contamination.

Seventh, the gash produced in the gasification of the biomass contains a prominent content of alkali metal oxides comprising K and Na, which is general 20-40 wt. % of the total ash. However, at a temperature higher than 800° C., the alkali metal oxides is apt to be gasified and mixed into the synthetic gas, which not only affects the property of the synthetic gas, but also adheres to the pipes and devices together with the tar, thereby resulting a serious corrosion on the devices and pipes.

In view of the above existing problems, technologies of direct gasification of biomass are difficult to be applied in practical production. Thus, a method for gasifying the biomass which can be applied in industrial production and converted to commercial benefits is desired.

SUMMARY OF THE INVENTION

In view of the above-described problems, it is one objective of the invention to provide a method and a system for producing synthetic gas from biomass by low temperature pyrolysis and high temperature gasification. The method features easy control, energy saving, and low cost. The produced synthetic gas has a high efficiency and high heat value, with absence of tar or alkali metal dioxides.

To achieve the above objective, there is provided a method for producing synthetic gas from biomass by low temperature pyrolysis and high temperature gasification. The method employs superheated water vapor as an oxidant and an energy carrier, conducts biomass pyrolysis and gasification at different temperature ranges, and finally produces clean synthetic gas. The method comprises the following steps:

a) Grinding the biomass, feeding the biomass into a pyrolysis furnace while spraying a first superheated water vapor into the pyrolysis furnace, controlling the pyrolysis furnace at an operating temperature of 500-800° C., contacting the biomass with the first superheated water vapor for a pyrolysis reaction to yield crude synthetic gas and an ash comprising a coke. Because the operating temperature of the pyrolysis furnace is below sublimation points of alkali metal oxides comprising K and Na, the alkali metal oxides exist in the ash comprising the coke, and the crude synthetic gas comprises no tar or minor tar.

b) Cooling the ash comprising the coke generally to a temperature of 150° C. below, and separating the coke from the ash. The coke is used for producing synthetic gas in the following step, and the ash comprising the alkali metal oxides are transported to an ash storehouse.

c) Transporting the crude synthetic gas and the coke into a gasifier, spraying a second superheated water vapor into the gasifier, controlling the gasifier at an operating temperature of 1200-1600° C., contacting the biomass with the second superheated water vapor for a gasification reaction to yield primary synthetic gas. Because the operating temperature of the gasifier is above a temperature to form tars, the crude synthetic gas and the coke are fully gasified, and the acquired primary synthetic gas comprises no tar.

d) Cooling, dust removing, deacidifying, and desiccating the primary synthetic gas to yield clean synthetic gas. The process of cooling down not only is a necessity in the whole process for production of the synthetic gas, but also recovers a large amount of sensible heat for comprehensive utilization. The process of dust removal separates the dust from the crude synthetic gas, and lowers the dust concentration of the gas to 50 mg/Nm$^3$ below. Harmful ingredients like $H_2S$, COS, HCL, $NH_3$, and HCN are removed from the synthetic gas in the deacidification process. After desiccation, the primary synthetic gas is transformed into the clean synthetic gas, which is stored for latter industrial application.

In a class of this embodiment, the ground biomass in step a) has a particle size of 20 mm×20 mm below and a water content of 40 wt. % below. Biomass of such a particle size and water content fully contacts with the superheated water vapor, so that processes of desiccation, separation of volatile matters, pyrolysis, and evaporation are stably conducted, and the operating temperature of the gasifier is easy control, cokes do not form in the pyrolysis furnace.

In a class of this embodiment, in step a), a nitrogen atmosphere is provided at a feed inlet of the pyrolysis furnace in case of fire and explosion caused by leakage of the crude synthetic gas from the pyrolysis furnace.

In a class of this embodiment, in step a), an operating temperature of the pyrolysis furnace is controlled at 500-650° C., an operating pressure of the pyrolysis furnace is controlled at 105-109 kPa. An input speed of the first superheated water vapor into the pyrolysis furnace is 35-50 m/s; a retention time of the crude synthetic gas in the pyrolysis furnace is 15-20 s, and an output speed of the crude synthetic gas from the pyrolysis furnace is 15-20 m/s. Thus, the pyrolysis furnace operates at a normal pressure, and no special pressure device is needed, thereby lowering the production cost. The biomass in the pyrolysis furnace is fast desiccated, separated from volatile matters, and pyrolyzed during the contact with the crude synthetic gas and the first superheated water vapor. Furthermore, the operating temperature of the pyrolysis furnace is much lower than sublimation points of the alkali metal oxides, which are about 800° C., so that the alkali metal oxides are removed from the crude synthetic gas. The relatively lower output speed from the pyrolysis furnace prevents the ash from aggregating in the outlet of the pyrolysis furnace and the gas pips.

In a class of this embodiment, in step c), an operating temperature of the gasifier is controlled at 1200-1400° C., and a preferable operating pressure of the gasifier is controlled at 105-109 kPa. An input speed of the second superheated water vapor into the gasifier is 35-50 m/s; and a retention time of the primary synthetic gas in the gasifier is 15-20 s, and an output speed of the primary synthetic gas from the gasifier is 15-20 m/s. Thus, the gasifier operates at a normal pressure, and no special pressure device is needed, thereby lowering the production cost. A high input speed of the second superheated water vapor into the gasifier largely improves the contact and mix of the crude synthetic gas and the coke. The operating temperature range of the gasifier is suitable, which ensures a total gasification of the crude synthetic gas and the coke during the contact with the second superheated water vapor, the acquired primary synthetic gas comprises no tar; at the same time the energy consumption is lowered as much as possible, and the performance of the gasifier is largely improved.

In a class of this embodiment, in step d), the primary synthetic gas is cooled down to a temperature of 260-320° C., and then cleaned. As the temperature of the primary synthetic gas output from the gasifier is still high, about 120-1400° C., the cooling process is not only conducive to the later dust collection, deacidification, and desiccation, but also helpful to recover the sensible heat in the primary synthetic gas, thereby achieving a comprehensive utilization of the exhaust heat.

A system for producing synthetic gas from biomass by low temperature pyrolysis and high temperature gasification according to the above method, comprises: the pyrolysis furnace, the gasifier, a first plasma torch heater, a high temperature plasma torch heater, a water storage tank, a water pump, and a heat exchanger.

The water storage tank is connected to a water inlet of the heat exchanger via the water pump. A vapor outlet of the heat exchanger is at the same time connected to a vapor inlet of the first plasma torch heater and a vapor inlet of the second plasma torch heater. A vapor outlet of the low temperature torch heater is connected to a vapor nozzle of the pyrolysis furnace. A vapor outlet of the second plasma torch heater is connected to a vapor nozzle of the gasifier.

A gas outlet of the pyrolysis furnace is connected to a gas inlet of the gasifier, an ash outlet of the pyrolysis furnace is connected to an ash inlet of an ash cooler, and an ash outlet of the ash cooler is connected to a feed inlet of an ash-coke separator. A gas outlet of the gasifier is connected to a gas inlet of the heat exchanger; and a gas outlet of the heat exchanger is connected to a dust collector, a deacidification tower, and a desiccator in series.

The plasma torch heater is advantageous in ultra-high temperature heat, fast transfer of heat and mass, high efficiency, and adjustable heat power, when it is used to heat the water in the water storage tank, superheated water vapor can be effectively, successively, and stably produced. The superheated water vapor is functioned as not only an oxidant but also an energy carrier, so that the gasifier is maintained to work stably. The heat exchanger effectively recovers a large amount of the sensible heat of the primary synthetic gas. The water in the water storage tank is preheated and transformed into a saturated water vapor due to the sensible heat, and the saturated water vapor is then transported to the plasma torch heater, thus, the energy consumption of the plasma torch heater is lowered, and comprehensive utilization of heat energy is achieved.

In a class of this embodiment, a nitrogen protecting device is connected to a feed inlet of the pyrolysis furnace. A nitrogen sealing layer prevents the crude synthetic gas from leaking out of the gasifier, and keeps the air outside the gasifier, the fire and explosion are eliminated and the property of the crude synthetic gas is assured.

In a class of this embodiment, a coke outlet of the ash-coke separator is connected to a coke inlet of the gasifier via a coke transporter. For example, a screw feeder is employed to directly transport the coke to the gasifier, so that the intermediate manual transportation is saved, which improves the stability and the succession of the gasifier.

In a class of this embodiment, the vapor nozzles arranged on the pyrolysis furnace and the gasifier are grouped into 2-4 height levels, respectively, and the vapor nozzles of each level are evenly and tangentially arranged along a circumferential direction. Thus, the superheated water vapor is sprayed into the pyrolysis furnace and the gasifier from different levels, and an even and stable temperature filed is maintained at different height levels, resulting in a fully contact between the superheated water vapor and the reactants.

Based on the inherent characteristics of the water, ash, volatile matters, and ash fusion point of the biomass, and combined with the operating features of the gasifier, the method of the invention employs the superheated water vapor, rather than the conventional oxidant air or oxygenized air, to produce synthetic gas from biomass by low temperature pyrolysis and high temperature gasification.

Advantages of the invention are summarized hereinbelow:
First, the superheated water vapor is employed to indirectly gasify the biomass. The superheated water vapor is not only an oxidant but also an energy carrier, so that the oxidant air or oxygenized air is not necessary, which means a highly energy consumed air separating device is not necessitated, and the energy consumption in the whole process and the total production cost are largely minimized.

Second, no self-ignition occurs in the biomass during the pyrolysis and the gasification, thereby effectively solving the problems in conventional gasify process, such as fuel explosion in the pyrolysis furnace or the gasifier, regional cokings, and difficulties in controlling each process. Because the air or the oxygenized air is not necessary in the reaction anymore, the synthetic gas has a high ratio of $H_2/CO$, and a high content of the effective gas ($CO+H_2$), which is 85% above, thus, the heat value of the synthetic gas is largely improved, and the use of the synthetic gas is much wider.

Third, the main reaction devices are the pyrolysis furnace and the gasifier. The biomass is at first pyrolyzed into the crude synthetic gas and the coke at a low temperature, and both the productions are gasified at a high temperature. Since the temperature ranges are suitably set, the produced crude synthetic gas comprises no alkali metal oxides, the tar and coke are all transformed into the primary synthetic gas, so that the carbon conversion is very high, the acquired primary synthetic gas is absent of impurities that are dirty and corrosive to the devices and pipes, and the later cleaning process becomes much simpler.

Fourth, the plasma torch heater produces all the heat energy which is necessary for biomass gasification by the superheated water vapor outside the gasifier, the heat energy of the biomass fuel is all transformed into a chemical energy, and the efficiency of the cooled gas is 88% above, which is 8% higher than that of the conventional.

Fifth, the plasma torch heater has a high heat efficiency, and adjustable input power, when the components of the biomass fuel changes, the power of the plasma torch heater can be adjusted, so that it is very convenient to control the temperature of the superheated water vapor, and maintain the gasifier work stably, and assure a stable output of the primary synthetic gas and a stable property.

Tests have shown that, the method and the system of the invention is applicable to different kinds of biomass fuels, and is especially applicable in industries of the integrated biomass gasification cycle combination and the biomass liquid fuel.

BRIEF DESCRIPTION OF THE DRAWINGS

The invention is described hereinbelow with reference to accompanying drawings, in which the sole figure is a structure diagram of a system for producing synthetic gas from biomass by low temperature pyrolysis and high temperature gasification according to one embodiment of the invention.

DETAILED DESCRIPTION OF THE EMBODIMENTS

For further illustrating the invention, experiments detailing a method and a system for producing synthetic gas from biomass by low temperature pyrolysis and high temperature gasification are described below. It should be noted that the following examples are intended to describe and not to limit the invention.

As shown in FIG. 1, a system for producing synthetic gas from biomass by low temperature pyrolysis and high temperature gasification, comprises: a belt conveyer 1; a hopper 2; a screw feeder 3; a pyrolysis furnace 5 and a gasifier 9 for pyrolysis and gasification of the biomass, respectively; a first plasma torch heater 8 and a second plasma torch heater 10 for supplying low temperature superheated water and high temperature superheated water for the pyrolysis furnace 5 and the gasifier 9, respectively; a water storage tank 17 and a water pump 16 for supplying water to the first plasma torch heater 8 and the second plasma torch heater 10; a heat exchanger 11 for comprehensive utilization of heat energy; and a dust collector 12, a deacidification tower 13, and a desiccator 14 for later cleaning of the synthetic gas.

An output end of the belt conveyer 1 is arranged above an inlet of the hopper 2, an outlet of the hopper 2 is connected to a feed inlet of the screw feeder 3, and a feed outlet of the screw feeder 3 is connected to a feed inlet of the pyrolysis furnace 5.

As a key device for a first stage of biomass processing, the pyrolysis furnace 5 comprises a casing comprising an air cooled jacket or a water cooled jacket, and is thermal insulated at a normal pressure. The feed inlet of the pyrolysis furnace 5 is arranged on an upper part or an upper end; to assure an even biomass addition and a stable flow field inside the pyrolysis furnace, the number of the feed inlet is two or four. A nitrogen protecting device 4 is connected to the feed inlet of the pyrolysis furnace 5, so that a nitrogen sealing layer is formed for effectively separating the crude synthetic gas from the air. A gas outlet of the pyrolysis furnace 5 is arranged on the upper part or a lower part, and is connected to a gas inlet of the gasifier 9 via a pipe, so that the crude synthetic gas is transported to the gasifier 9. The pyrolysis furnace 5 comprises an ash outlet arranged at a bottom; the number of the ash outlet is one or two. An ash discharged from the ash outlet is in a liquid state. The ash outlet is connected to an ash inlet of an ash cooler 6 for cooling the ash comprising a coke. An ash outlet of the ash cooler is connected to a feed inlet of an ash-coke separator 7 for separating the coke from the ash. Preferably, a coke outlet of the ash-coke separator 7 is connected to a coke inlet of the gasifier 9 via a coke transporter 19, which is energy saving compared with the manual transportation and assures a stable and continuous operation of the gasifier 9.

As a key device for a second stage of biomass processing, the gasifier 9 also comprises a casing comprising an air cooled jacket or a water cooled jacket, and is thermal insulated at a normal pressure. The coke inlet of the gasifier 9 is arranged on an upper part or an upper end. To assure an even coke addition and a stable flow field inside the gasifier 9, the number of the coke inlet is one or two in compliance with the capacity. An ash outlet of the gasifier 9 is arranged at a bottom, from which an ash is discharged in a liquid state; the number of the ash outlet is one or two in compliance with the capacity. A gas outlet of the gasifier 9 is arranged on the upper part, or a lower end, and is connected to a gas inlet of the heat exchanger 11, a gas outlet of the heat exchanger 11 is connected to the dust collector 12, the deacidification tower 13, and the desiccator 14 in series, and an outlet of the desiccator 14 is connected to a gas storage tank 15.

The superheated water vapor sprayed into the pyrolysis furnace 5 and the gasifier 9 is transformed from soft water or desalted water in the water storage tank 17 by heating. An outlet of the water storage tank 17 is connected to a water inlet of the heat exchanger 11 via the water pump 16. The heat exchanger 11 is usually a scrapped boiler. A vapor outlet of the heat exchanger 11 is at the same time connected to a vapor inlet of the first plasma torch heater 8 and a vapor inlet of the second plasma torch heater 10. A vapor outlet of the first plasma torch heater 8 is connected to a vapor nozzle of the pyrolysis furnace 5 via a pipe. A vapor outlet of the second plasma torch heater 10 is connected to a vapor nozzle of the gasifier 9 via a pipe. Preferably, the vapor nozzles arranged on the pyrolysis furnace 5 and the gasifier 9 are grouped into 2-4 height levels, respectively, and the vapor nozzles of each level are evenly and tangentially arranged along a circumferential direction. Thus, an even and stable vapor filed is maintained, and a fully contact between the superheated water vapor and the reactants is achieved.

The system also comprises an ash storehouse 18, and the solid ash from the ash-coke separator 7 and the liquid ash from the gasifier 9 are transported to the ash storehouse 18 by a manual or mechanical mode.

A method for producing synthetic gas from biomass by low temperature pyrolysis and high temperature gasification using the above system is specifically described as follows:

A) Ground biomass is transported to the pyrolysis furnace 5 via the belt conveyor 1, the hopper 2, and the screw feeder 3 in turn, at the same time nitrogen is input from a nitrogen protecting device 4 into a feed inlet of the pyrolysis furnace 5. When the biomass is a gray straw, for example twigs and roots of trees, a particle size of the biomass is controlled at 20 mm×20 mm below, and a water content of the biomass is controlled at 40 wt. % below. When the biomass is yellow straw, for example stalks of threshed grain, thatch, stalks of corns, the particle size of the biomass can be relatively large.

B) The desalted water is output from a water storage tank 17 to a water inlet of the heat exchanger 11 via a water pump 16, and the desalted water exchanges heat with primary synthetic gas input from a gas inlet of the heat exchanger 11, and a sensible heat is extracted by the desalted water, during which 0.4-0.6 Mpa of saturated vapor is produced. The saturated vapor is output from a vapor outlet of the heat exchanger 11 to the first plasma torch heater 8 and the second plasma torch heater 10 and transformed into superheated water vapors at different temperatures.

C) A first superheated water vapor produced from the first plasma torch heater 8 is at a temperature of 500-800° C., and is input into the pyrolysis furnace 5 via the vapor nozzles. Operating parameters of the pyrolysis furnace 5 are: 500-650° C. of a temperature, and 105-109 kPa of a pressure. An input speed of the first superheated water vapor into the pyrolysis furnace 5 is controlled at 35-50 m/s, so that the biomass is fully contacted with the first superheated water vapor and pyrolyzed into the crude synthetic gas and the ash comprising the coke. The crude synthetic gas is maintained in the pyrolysis furnace 5 for 15-20 s, and an output speed of the crude synthetic gas from the pyrolysis furnace 5 is controlled at 15-20 m/s.

D) The crude synthetic gas at the temperature of 500-650° C. is output from the pyrolysis furnace 5 to the gas inlet of the gasifier 9 via the pipe; and the ash comprising the coke at the temperature of 500-650° C. is transported from the ash outlet of the pyrolysis furnace 5 into the ash cooler, after the heat recovery, the temperature of the ash comprising the ash is cooled down to 150° C. below. The coke is separated from the ash by the ash-coke separator 7. The coke is then transported to the coke inlet of the gasifier 9 via the coke transporter 19, and the ash from the ash-coke separator 7 is transported to the ash storehouse 18.

E) A second superheated water vapor produced from the second plasma torch heater 10 is at a temperature of 1200-1600° C., and is input into the gasifier 9 via the vapor nozzles. Operating parameters of the gasifier 9 are: 1200-1400° C. of a temperature, and 105-109 kPa of a pressure. An input speed of the second superheated water vapor into the gasifier 9 is controlled at 35-50 m/s, so that the crude synthetic gas is fully contacted with the second superheated water vapor and gasified into the primary synthetic gas. The primary synthetic gas is maintained in the gasifier 9 for 15-20 s, and an output speed of the primary synthetic gas from the gasifier 9 is controlled at 15-20 m/s.

F) The liquid ash at the temperature of 1200-1400° C. is output from the ash outlet of the gasifier 9 and transported to the ash storehouse 18 for comprehensive utilization. The primary synthetic gas at the temperature of 1200-1400° C. is transported from the gasifier 6 to the gas inlet of the heat exchanger 11 via the pipe. After being cooled down to a temperature of 260-320° C. by the desalted water, the primary synthetic gas is output from the gas outlet of the heat exchanger 11 to the dust collector 12. Dust in the primary synthetic gas is arrested by the dust collector 12, and a dust concentration of the primary synthetic gas at the outlet of the dust collector 12 is 50 mg/Nm$^3$ below.

G) After dust removal, the primary synthetic gas is transported to the deacidification tower 13, in which harmful ingredients like $H_2S$, COS, HCL, $NH_3$, and HCN are removed.

H) After deacidification, the primary synthetic gas is transported into the desiccator 14, in which the water is removed, and clean synthetic gas is acquired. The clean synthetic gas is transported into a gas storage tank 15 and is stored for later industrial application.

After many times of tests and data detections, main components and characteristics thereof of the clean synthetic gas are shown in Table 1.

TABLE 1

Main components and characteristics of clean synthetic gas

| Number | Component | Unit | Value |
| --- | --- | --- | --- |
| 1 | CO | % (vol.) | 30-40 |
| 2 | $H_2$ | % (vol.) | 40-50 |
| 3 | $N_2$ + Ar | % (vol.) | <1.0 |
| 4 | $CO_2$ | % (vol.) | 15-20 |
| 5 | $CH_2$ | % (vol.) | 5-6 |
| 6 | $C_nH_m$ | % (vol.) | <2 |
| 7 | Heat value of synthetic gas (LHV) | MJ/Nm$^3$ | 12.5-13.4 |
| 8 | Efficiency of a cooled gas | % | ~88.0 |

As shown in Table 1, the clean synthetic gas produced by the method comprises 90% of a total content of ($CO+H_2$), a ratio of $H_2$/CO is equal to or larger than 1, a heat value of the synthetic gas is 12.5-13.4 MJ/Nm$^3$, and an efficiency of the cooled gas is about 88%. Thus, the synthetic gas can bring great commercial benefits, and is especially applicable in industries of the integrated biomass gasification cycle combination and the biomass liquid fuel.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for producing synthetic gas from biomass, the method comprising the following steps:
   a) generating a first superheated water vapor at a temperature of 500-800° C. grinding the biomass, feeding the biomass into a pyrolysis furnace while spraying the first superheated water vapor into the pyrolysis furnace to heat the pyrolysis furnace to a temperature of 500-650° C., contacting the biomass with the first superheated water vapor for a pyrolysis reaction to yield crude synthetic gas and ash comprising coke;
   b) cooling the ash, and separating the coke for the ash;
   c) generating a second superheated water vapor at a temperature of 1200-1600° C., transporting the crude synthetic gas and the coke into a gasifier, spraying the second superheated water vapor into the gasifier to heat the gasifier to a temperature of 1200-1400° C., contacting the biomass with the second superheated water vapor for a gasification reaction to yield primary synthetic gas; and
   d) cooling the primary synthetic gas, removing dust from the primary synthetic gas, deacidifying the primary gas, and desiccating the primary synthetic gas to obtain clean synthetic gas.

2. The method of claim 1, wherein the biomass in step a) has a particle size of less than 20 mm×20 mm and a water content of less than 40 wt. %.

3. The method of claim 2, wherein in step a) a nitrogen atmosphere is provided at a feed inlet of the pyrolysis furnace.

4. The method of claim 2, wherein
an operating pressure of the pyrolysis furnace is controlled at 105-109 kPa;
an input speed of the first superheated water vapor into the pyrolysis furnace is 35-50 m/s; and
a retention time of the crude synthetic gas in the pyrolysis furnace is 15-20 s, and an output speed of the crude synthetic gas from the pyrolysis furnace is 15-20 m/s.

5. The method of claim 2, wherein
an operating pressure of the gasifier is controlled at 105-109 kPa;
an input speed of the second superheated water vapor into the gasifier is 35-50 m/s; and
a retention time of the primary synthetic gas in the gasifier is 15-20 s, and an output speed of the primary synthetic gas from the gasifier is 15-20 m/s.

6. The method of claim 2, wherein in step d) the primary synthetic gas is cooled down to a temperature of 260-320° C.

7. The method of claim 1, wherein in step a) a nitrogen atmosphere is provided at a feed inlet of the pyrolysis furnace.

8. The method of claim 1, wherein
an operating pressure of the pyrolysis furnace is controlled at 105-109 kPa;
an input speed of the first superheated water vapor into the pyrolysis furnace is 35-50 m/s; and
a retention time of the crude synthetic gas in the pyrolysis furnace is 15-20 s, and an output speed of the crude synthetic gas from the pyrolysis furnace is 15-20 m/s.

9. The method of claim 1, wherein
an operating pressure of the gasifier is controlled at 105-109 kPa;
an input speed of the second superheated water vapor into the gasifier is 35-50 m/s; and
a retention time of the primary synthetic gas in the gasifier is 15-20 s, and an output speed of the primary synthetic gas from the gasifier is 15-20 m/s.

10. The method of claim 1, wherein in step d) the primary synthetic gas is cooled down to a temperature of 260-320° C.

* * * * *